(12) United States Patent
Valkama et al.

(10) Patent No.: US 9,714,156 B2
(45) Date of Patent: Jul. 25, 2017

(54) APPARATUS AND METHOD FOR ALIGNING GUIDE RAILS IN AN ELEVATOR SHAFT

(71) Applicant: KONE Corporation, Helsinki (FI)

(72) Inventors: Peetu Valkama, Pinsiö (FI); Harri Mäkinen, Tampere (FI); Mikael Haag, Vantaa (FI); Antti Mertala, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 153 days.

(21) Appl. No.: 14/818,037

(22) Filed: Aug. 4, 2015

(65) Prior Publication Data

US 2016/0068369 A1    Mar. 10, 2016

(30) Foreign Application Priority Data

Sep. 4, 2014  (EP) .................................... 14183546

(51) Int. Cl.
| | |
|---|---|
| *G01B 5/25* | (2006.01) |
| *B66B 5/00* | (2006.01) |
| *B66B 7/12* | (2006.01) |
| *B66B 19/00* | (2006.01) |

(52) U.S. Cl.
CPC .......... *B66B 5/0087* (2013.01); *B66B 7/1246* (2013.01); *G01B 5/25* (2013.01); *B66B 19/002* (2013.01)

(58) Field of Classification Search
CPC .................................... G01B 5/24; G01B 5/25
USPC ..................................................... 33/613, 645
See application file for complete search history.

(56) References Cited

U.S. PATENT DOCUMENTS

| | | | | |
|---|---|---|---|---|
| 2,402,888 A | * | 6/1946 | Hall ...................... | B66B 5/0087 33/404 |
| 5,119,908 A | * | 6/1992 | Korhonen ............... | B66B 7/027 187/408 |
| 7,997,000 B2 | * | 8/2011 | Van Der Meijden . | B66B 19/002 33/404 |
| 2016/0060078 A1 | * | 3/2016 | Mertala ................. | B66B 19/002 52/741.1 |

(Continued)

FOREIGN PATENT DOCUMENTS

| | | |
|---|---|---|
| JP | 9-208152 A | 8/1997 |
| JP | 11-255450 A | 9/1999 |

*Primary Examiner* — G. Bradley Bennett
(74) *Attorney, Agent, or Firm* — Birch, Stewart, Kolasch & Birch, LLP

(57) ABSTRACT

The apparatus includes a positioning unit and an alignment unit. The positioning unit extends across the elevator shaft in a second direction and comprises at each end a first attachment mechanism movable in the second direction for supporting the positioning unit on opposite wall structures in the elevator shaft. The alignment unit extends across the elevator shaft in the second direction and is supported with support parts on each end portion of the positioning unit. Each end portion of the alignment unit is individually movable in relation to the positioning unit in a third direction perpendicular to the second direction. The alignment unit includes further at each end a second attachment mechanism movable in the second direction for supporting the alignment unit on opposite guide rails in the shaft. The second attachment mechanism includes a gripper for gripping on the guide rail.

20 Claims, 4 Drawing Sheets

(56) References Cited

U.S. PATENT DOCUMENTS

2016/0311659 A1* 10/2016 Mertala .................. E04G 3/246
2016/0325968 A1* 11/2016 Baker ................... B66B 19/002
2017/0036890 A1*  2/2017 Haag ...................... B66B 7/026

* cited by examiner

APPARATUS AND METHOD FOR ALIGNING GUIDE RAILS IN AN ELEVATOR SHAFT

FIELD OF THE INVENTION

The invention relates to an apparatus for aligning guide rails in an elevator shaft, a lifting machinery moving an elevator car in a first direction upwards and downwards in the vertically extending elevator shaft being restricted by wall structures, the elevator car being guided by guide rails supported on the wall structures in the elevator shaft.

The invention relates further to a method for aligning guide rails in an elevator shaft including using the apparatus of the invention.

BACKGROUND ART

An elevator comprises an elevator car, lifting machinery, ropes, and a counter weight. The elevator car is supported on a transport frame being formed by a sling or a car frame. The transport frame surrounds the elevator car. The lifting machinery comprises a traction sheave, a machinery brake and an electric motor being connected via a shaft. The electric motor is used to rotate the traction sheave and the machinery brake is used to stop the rotation of the traction sheave. The lifting machinery is situated in a machine room. The lifting machinery moves the car upwards and downwards in a vertically extending elevator shaft. The transport frame and thereby also the elevator car is carried by the ropes, which connect the elevator car over the traction sheave to the counter weight. The transport frame of the elevator car is further supported with gliding means at guide rails extending in the vertical direction in the elevator shaft. The gliding means can comprise rolls rolling on the guide rails or gliding shoes gliding on the guide rails when the elevator car is mowing upwards and downwards in the elevator shaft. The guide rails are supported through fish plates on fastening brackets that are supported at the side wall structures of the elevator shaft. The gliding means engaging with the guide rails keep the elevator car in position in the horizontal plane when the elevator car moves upwards and downwards in the elevator shaft. The counter weight is supported in a corresponding way on guide rails supported on the wall structure of the elevator shaft. The elevator car transports people and/or goods between the landings in the building. The elevator shaft can be formed so that the wall structure is formed of solid walls or so that the wall structure is formed of an open steel structure.

The guide rails are formed of guide rail elements of a certain length. The guide rail elements are connected in the installation phase end-on-end one after the other in the elevator shaft. When aligning elevator guide rails every bracket and fish plate associated with the bracket needs to be adjusted and the straightness of the guide rail is measured locally. Such a prior art system requires a lot of manual adjustment work and it may require multiple adjustment passes. The quality of the alignment will vary depending on the mechanic who is doing the alignment.

BRIEF DESCRIPTION OF THE INVENTION

An object of the present invention is to present a novel apparatus and method for aligning guide rails of an elevator.

The apparatus for aligning guide rails in an elevator shaft according to the invention has lifting machinery that moves an elevator car in a first direction upwards and downwards in the vertically extending elevator shaft, which is restricted by wall structures. The elevator car is guided by guide rails supported on the wall structures in the elevator shaft. The apparatus comprises:

A lifting machinery moves an elevator car in a first direction upwards and downwards in the vertically extending elevator shaft being restricted by wall structures. The elevator car is guided by guide rails supported on the wall structures in the elevator shaft. The apparatus comprises:

a positioning unit extending horizontally across the elevator shaft in a second direction and comprising first attachment means movable in the second direction at each end of the positioning unit for supporting the positioning unit on opposite wall structures in the elevator shaft, an alignment unit extending across the elevator shaft in the second direction and being movably supported with support parts on each end portion of the positioning unit and comprising second attachment means movable in the second direction at each end of the alignment unit for supporting the alignment unit on opposite guide rails in the shaft, means for moving the attachment means in the second direction, and means for moving each support part separately horizontally in relation to the positioning unit in a third direction being perpendicular to the second direction, said second attachment means comprising gripping means for gripping on the guide rail, whereby opposite guide rails can be adjusted in relation to each other and in relation to the elevator shaft so that the opposite guide rails extend in a common vertical plane, and so that the opposite guide rails are at the same distance from the back of the shaft.

The method for aligning guide rails in an elevator shaft is characterized by the steps of:

using an apparatus comprising a positioning unit extending horizontally across the elevator shaft in a second direction and comprising first attachment means movable in the second direction at each end of the positioning unit for supporting the positioning unit on opposite wall structures or other support structures in an elevator shaft, and an alignment unit extending across the elevator shaft in the second direction and being supported with support parts on each end portion of the positioning unit so that each end portion of the alignment unit is individually movable in relation to the positioning unit in a third direction perpendicular to the second direction, and comprising second attachment means movable in the second direction at each end of the alignment unit for supporting the alignment unit on opposite guide rails in the shaft, said second attachment means comprising gripping means for gripping on the guide rail, for aligning opposite guide rails in an elevator shaft, whereby the alignment unit is used to align the two opposite guide rails in relation to each other and the positioning unit is used to align the two opposite guide rails in relation to the elevator shaft.

The mechanic moves during the alignment of the guide rails typically upwards and downwards in the elevator shaft on a working platform attached to the transport frame. The transport frame is moved by lifting means connected to the transport frame. The inventive apparatus can be supported on the transport frame when the mechanic moves between the support bracket locations in the elevator shaft. The mechanic stops the lifting means at each support bracket location and uses the inventive apparatus to align the guide rail at said bracket location. Each end of the alignment unit in the apparatus can be supported on the two opposite guide rails. Each end of the positioning unit can on the other hand be supported on opposite wall constructions and/or on dividing beams and/or on brackets in the shaft. This makes it possible to align the two opposite guide rails in relation to the direction between the guide rails (DBG) and in relation to the direction between the back wall construction and the front wall construction of the shaft (BTF).

The inventive apparatus will speed up the process-step of aligning the elevator guide rails compared to prior art methods. The inventive apparatus will also eliminate variations in the quality of the alignment. The quality of the alignment will be less dependent on the person performing the alignment. A trained technician can easily make a high quality alignment with the help of the inventive apparatus.

The inventive apparatus can be used in aligning the guide rails in a new installation and in re-adjusting the alignment of the guide rails in an existing elevator.

The length of the inventive apparatus can in one embodiment be adapted to elevator shafts of different dimensions.

BRIEF DESCRIPTION OF THE DRAWINGS

The invention will in the following be described in greater detail by means of preferred embodiments with reference to the attached drawings, in which.

DETAILED DESCRIPTION OF EMBODIMENTS OF THE INVENTION

Figure 1:
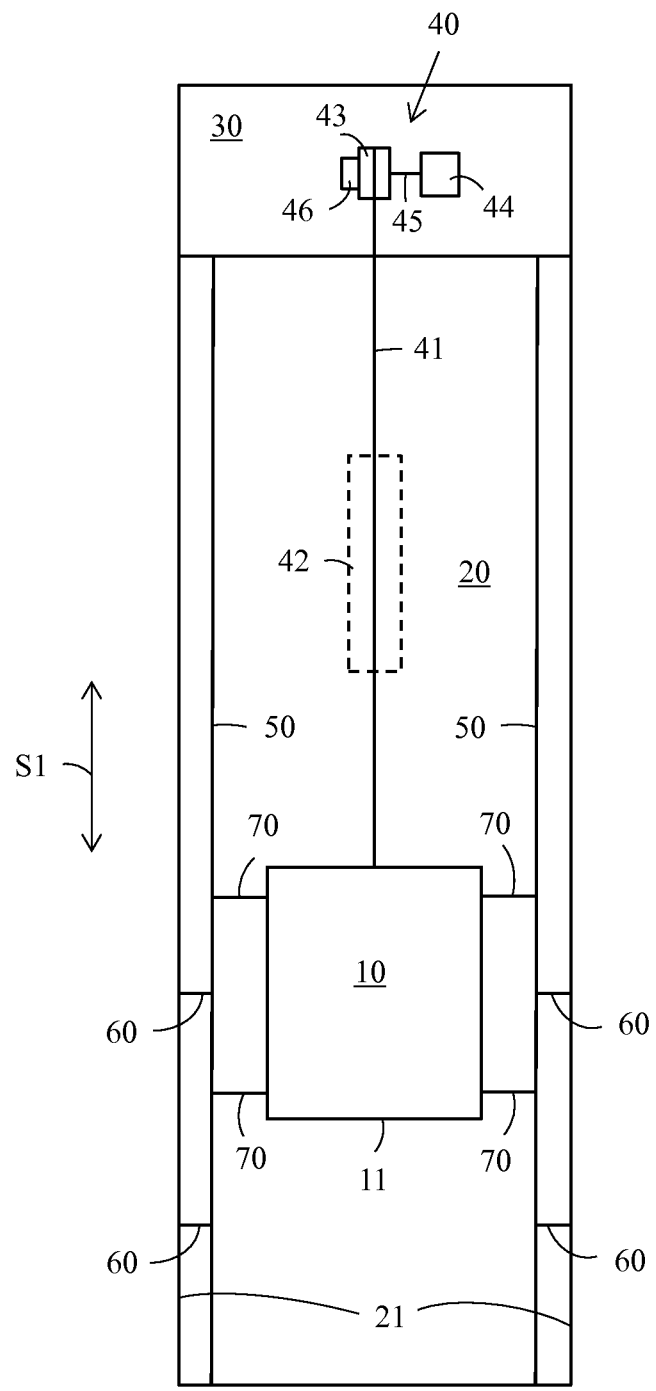
FIG. 1 shows a vertical cross section of an elevator.

FIG. 1 shows a vertical cross section of an elevator. The elevator comprises an elevator car 10, lifting machinery 40, ropes 41, and a counter weight 42. The elevator car 10 is supported on a transport frame 11 surrounding the elevator car 10. The lifting machinery 40 comprises a traction sheave 43, a machinery brake 46 and an electric motor 44 being connected via a shaft 45. The electric motor 44 is used to rotate the traction sheave 43 and the machinery brake 46 is used to stop the rotation of the traction sheave 43. The lifting machinery 40 is situated in a machine room 30. The lifting machinery 40 moves the car 10 in a first direction S1 upwards and downwards in a vertically extending elevator shaft 20. The transport frame 11 and thereby also the elevator car 10 are carried by the ropes 41, which connect the elevator car 10 over the traction sheave 43 to the counter weight 42. The transport frame 11 of the elevator car 10 is further supported with gliding means 70 at guide rails 50 extending in the vertical direction in the elevator shaft 20. The figure shows two guide rails 50 at opposite sides of the elevator car 10. The gliding means 70 can comprise rolls rolling on the guide rails 50 or gliding shoes gliding on the guide rails 50 when the elevator car 10 is mowing upwards and downwards in the elevator shaft 20. The guide rails 50 are supported with fish plates at fastening brackets 60 and the support brackets 60 are attached to the side wall structures 21 or other support structures in the elevator shaft 20. The figure shows only two fastening brackets 60, but there are several fastening brackets 60 along the height of each guide rail 50. The gliding means 70 engaging with the guide rails 50 keep the elevator car 10 in position in the horizontal plane when the elevator car 10 moves upwards and downwards in the elevator shaft 20. The counter weight 42 is supported in a corresponding way on guide rails supported on the wall structure 21 of the elevator shaft 20. The elevator car 10 transports people and/or goods between the landings in the building. The elevator shaft 20 can be formed so that the wall structure 21 is formed of solid walls or so that the wall structure 21 is formed of an open steel structure.

The cross section of the guide rails 50 has normally the form of a letter T. The horizontal branch of the letter T is attached to fish plates being attached to the support brackets 60, which are attached to the wall structure 21 or other support structure in the elevator shaft 20. The vertical branch of the letter T forms three gliding surfaces for the gliding means 70 comprising rolls or gliding shoes. There are thus two opposite side gliding surfaces and one front gliding surface in the guide rail. The horizontal cross-section of the gliding means 70 has the form of a letter U so that the inner surface of the gliding means 70 sets against the three gliding surfaces of the guide rail 50. The gliding means 70 is attached to the transport frame 11.

The guide rails 50 extend vertically along the height of the elevator shaft 20. The guide rails 50 are thus formed of guide rail elements of a certain length e.g. 5 m. The guide rail elements are connected in the installation phase end-on-end one after the other. It is time consuming to install the guide rails 50 so that they are properly aligned along the whole height of the elevator shaft 20. The quality of the alignment will vary depending on the mechanic who is doing the alignment.

Variations in the alignment of the guide rails 50 will result in lateral forces acting on the gliding means 70 when the car 10 moves upwards and downwards in the elevator shaft 20. These lateral forces might cause vibrations to the gliding means 70 and thereby also to the elevator car 10. The vibrations acting on the elevator car 10 will also cause noise disturbing the passengers in the elevator car 10.

The mechanic moves during the alignment of the guide rails 50 typically upwards and downwards S1 in the elevator shaft 20 on a working platform attached to the transport frame 11. The transport frame 11 is moved by lifting means connected to the transport frame 11. The apparatus can be supported on the transport frame 11 when the mechanic moves between the support bracket 60 locations in the elevator shaft 20. The mechanic stops the lifting means at each support bracket 60 location and uses the inventive apparatus to align the guide rails 50 at said bracket 60 location.

Figure 2:
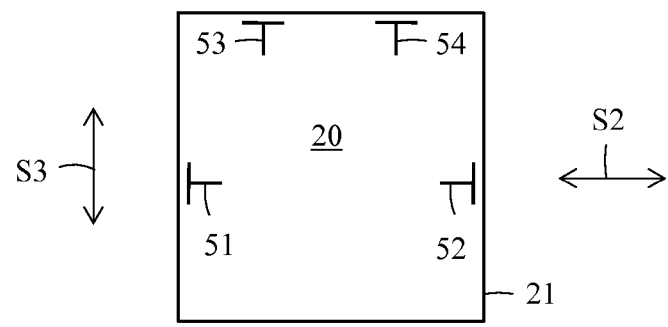
FIG. 2 shows a horizontal cross section of the elevator shaft.

FIG. 2 shows a horizontal cross section of the elevator shaft. The figure shows the wall structures 21 of the shaft 20 forming a rectangular cross section. There are first guide rails 51, 52 at the opposite side wall structures 21 of the shaft 20 guiding the elevator car 10. There are further second guide rails 53, 54 at the back wall structure 21 of the shaft 20 guiding the counterweight 42. The figure shows also a second direction S2 i.e. the direction between the guide rails (DBG) and a third direction S3 i.e. the direction from the back to the front (BTF). The second direction S2 is perpendicular to the third direction S3.

Figure 3:
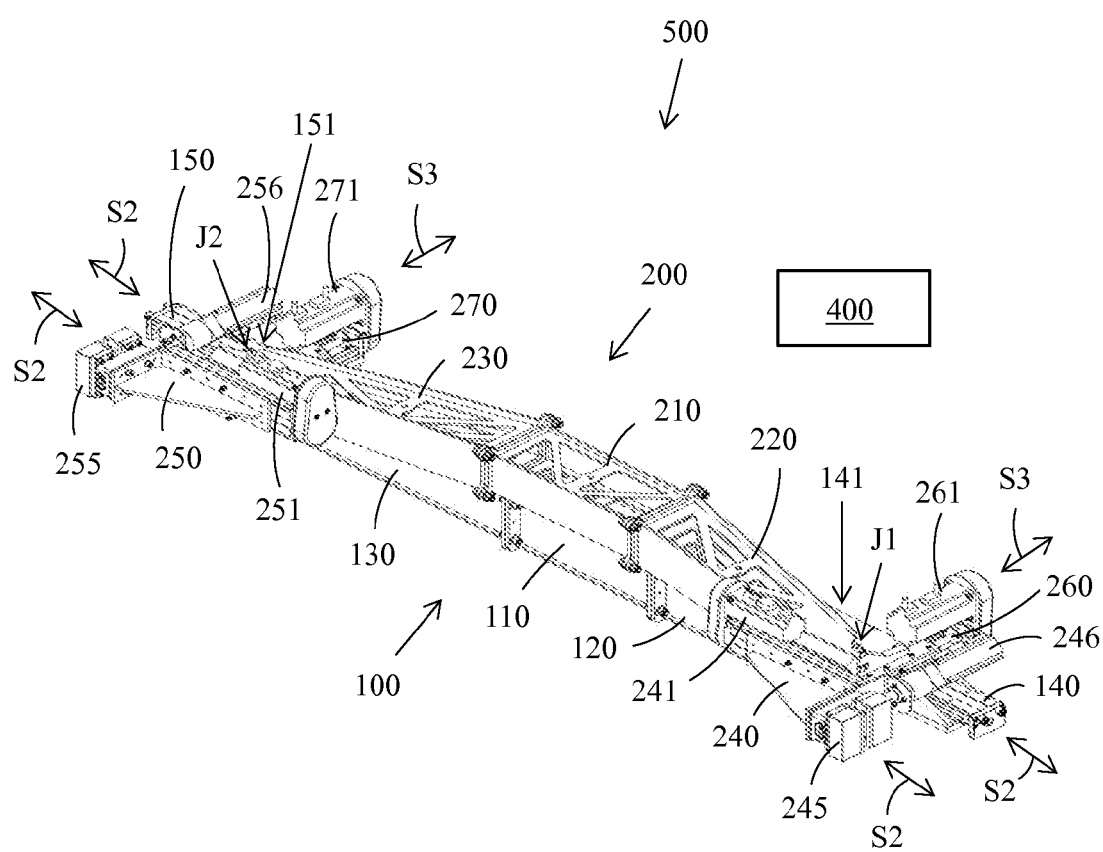
FIG. 3 shows an axonometric view of an apparatus for aligning guide rails in an elevator according to the invention.

FIG. 3 shows an axonometric view of an apparatus for aligning guide rails in an elevator according to the invention. The apparatus 500 for aligning guide rails 50 comprises a positioning unit 100 and an alignment unit 200.

The positioning unit 100 comprises a longitudinal support structure with a middle portion 110 and two opposite end portions 120, 130. The two opposite end portions 120, 130 are mirror images of each other. There could be several middle portions 110 of different lengths in order to adjust the length of the positioning unit 100 to different elevator shafts 20. The positioning unit 100 comprises further first attachment means 140, 150 at both ends of the positioning unit 100. The first attachment means 140, 150 are movable in the second direction S2 i.e. the direction between the guide rails (DBG). The positioning unit 100 extends across the elevator shaft 20 in the second direction S2. The first attachment means 140, 150 are used to lock the positioning unit 100 between the wall structures 21 and/or dividing beams and/or brackets 60 in the elevator shaft 20. An actuator 141, 151 (position shown only schematically in the figure) e.g. a linear motor in connection with each of the first attachment means 140, 150 can be used to move each of the first attachment means 140, 150 individually in the second direction S2.

The alignment unit 200 comprises a longitudinal support structure with a middle portion 210 and two opposite end portions 220, 230. The two opposite end portions 220, 230 are mirror images of each other. There could be several middle portions 210 of different lengths in order to adjust the length of the alignment unit 200 to different elevator shafts 20. The alignment unit comprises further second attachment means 240, 250 at both ends of the alignment unit 200. The second attachment means 240, 250 are movable in the second direction S2. An actuator 241, 251 e.g. a linear motor can be used to move each of the second attachment means 240, 250 individually in the second direction S2. Each of the second attachment means 240, 250 comprises further gripping means in the form of jaws 245, 255 positioned at the end of the second attachment means 240, 250. The jaws 245, 255 are movable in the third direction S3 perpendicular to the second direction S2. The jaws 245, 255 will thus grip on the opposite side surfaces of the guide rails 50. An actuator 246, 256 e.g. a linear motor can be used to move each of the jaws 245, 255 individually in the third direction S3. The alignment unit 200 is attached to the positioning unit 100 at each end of the positioning unit 100 with support parts 260, 270. The support parts 260, 270 are movable in the third direction S3 in relation to the positioning unit 100. The alignment unit 200 is attached with articulated joints J1, J2 to the support parts 260, 270. An actuator 261, 271 e.g. a linear motor can be used to move each of the support parts 260, 270 individually in the third direction S3. The articulated joints J1, J2 make it possible to adjust the alignment unit 200 so that it is non-parallel to the positioning unit 100.

The two second attachment means 240, 250 are moved with the actuators 241, 251 only in the second direction S2. It would, however, be possible to add a further actuator to one of the second attachment means 240, 250 in order to be able to turn said second attachment means 240, 250 in the horizontal plane around an articulated joint. It seems that such a possibility is not needed, but such a possibility could be added to the apparatus 500 if needed.

The apparatus 500 can be operated by a mechanic through a control unit 400. The control unit 400 can be attached to the apparatus 500 or it can be a separate entity that is connectable with a cable to the apparatus 500. There can naturally also be a wireless communication between the control module 400 and the apparatus 500. The control unit 400 is used to control all the actuators 141, 142 moving the first attachment means 140, 150, the actuators 241, 242 moving the second attachment means 240, 250, the actuators 246, 256 moving the gripping means 245, 255 and the actuators 261, 271 moving the support parts 260, 270.

Figure 4:
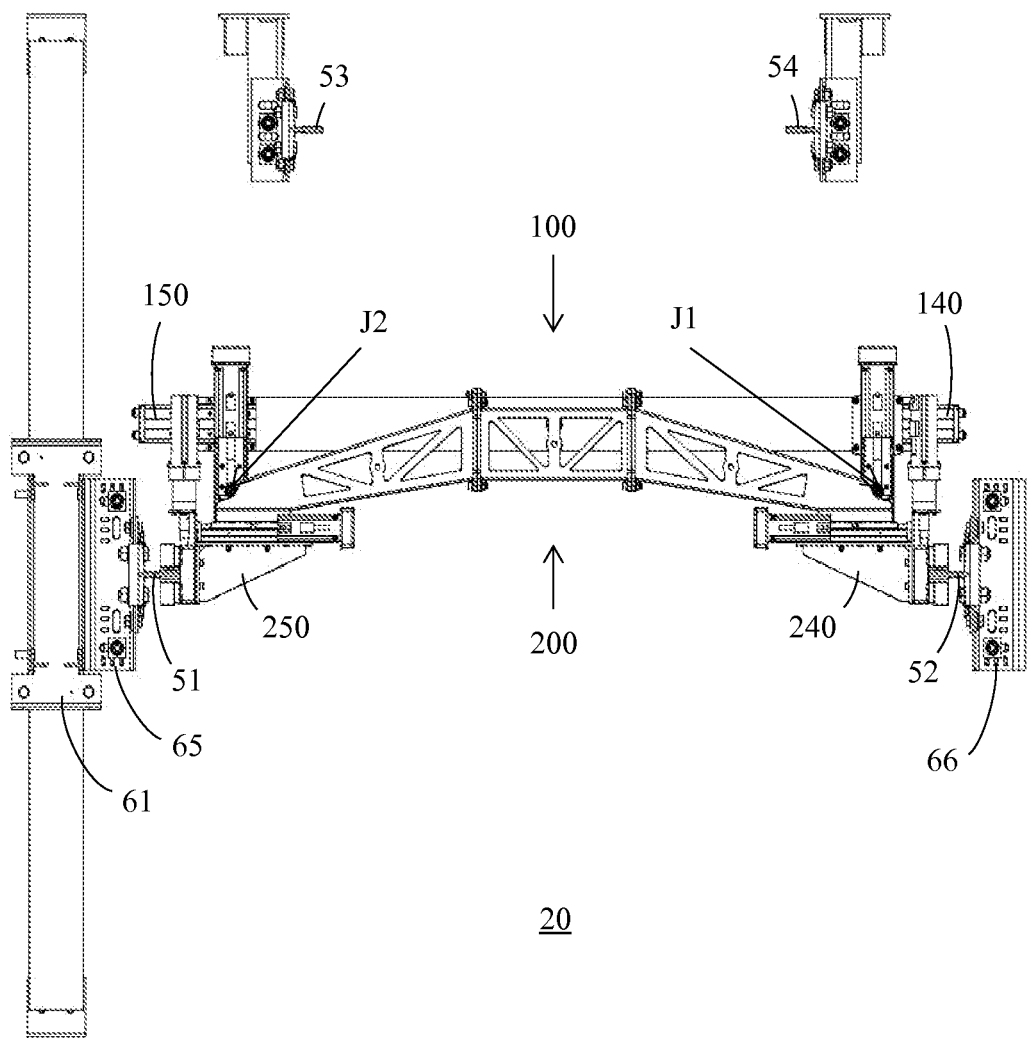
FIG. 4 shows a first phase of the operation of the apparatus of FIG. 3.

FIG. 4 shows a first phase of the operation of the apparatus of FIG. 3. The figure shows the bracket 61 at one side and the fish plates 65, 66 on both sides of the shaft 20. The guide rails 51, 52 are attached to the fish plates 65, 66 and the fish plates 65, 66 are attached to the brackets 60. The apparatus 500 can be supported on the transport frame 11 and lifted with the transport frame 11 to a first bracket 60 location during the alignment of the guide rails 50. The mechanic is travelling on the working platform attached to the transport frame 11. The mechanic operates then the apparatus 500 through the control unit 400 and attaches the alignment unit 200 with the jaws 245, 255 at the ends of the second attachment means 240, 250 to the two opposite guide rails 51, 52. The second attachment means 240, 250 are movable in the second direction S2 and the jaws 245, 255 are movable in the third direction S3 so that they can grip on the opposite vertical side surfaces of the guide rails 51, 52. The bracket 60 bolts and the fish plate 65, 66 bolts are then opened at both sides of the shaft 20 so that the guide rails 51, 52 can be moved. The guide rails 51, 52 on opposite sides of the shaft 20 are then adjusted relative to each other with the alignment unit 200. The frame of alignment unit 200 is stiff so that the two opposite guide rails 51, 52 will be positioned with the apexes facing towards each other when the gripping means 245, 255 grips the guide rails 50. There is thus no twist between the opposite guide rails 50 after this. The distance between the two opposite guide rails 50 in the direction (DBG) is also adjusted with the alignment unit 200. The position of each of the second attachment means 240, 250 in the second direction S2 determines said distance.

There is a plump line formed in the vicinity of each guide rail 51, 52 (not shown in the figure). There is further a contact-free measurement system measuring the distance i.e. in the DBG and the BFT direction from the guide rail 51, 52 to the plumb line that is in the vicinity of said guide rail 51, 52. The system calculates further the difference to a predetermined target value. Based on the differences of each guide rail 51, 52 from the target value, the needed control values (DBG, BFT and twist) are calculated. The control values are then transformed into incremental steps, which are fed as control signals to the control units of the linear motors in the apparatus 500. The DBG can also be measured based on the motor torque, which indicates when the second attachment means 240, 250 have reached their end position and are positioned against the guide rails 50. The position of the linear motors can then be read from the display of the control unit 400. The apparatus 500 can thus calculate the DBG based on the distance of the guide rails 51, 52 to the plumb lines and based on the position of each of the second attachment means 240, 250 in the second direction S2.

Figure 5:
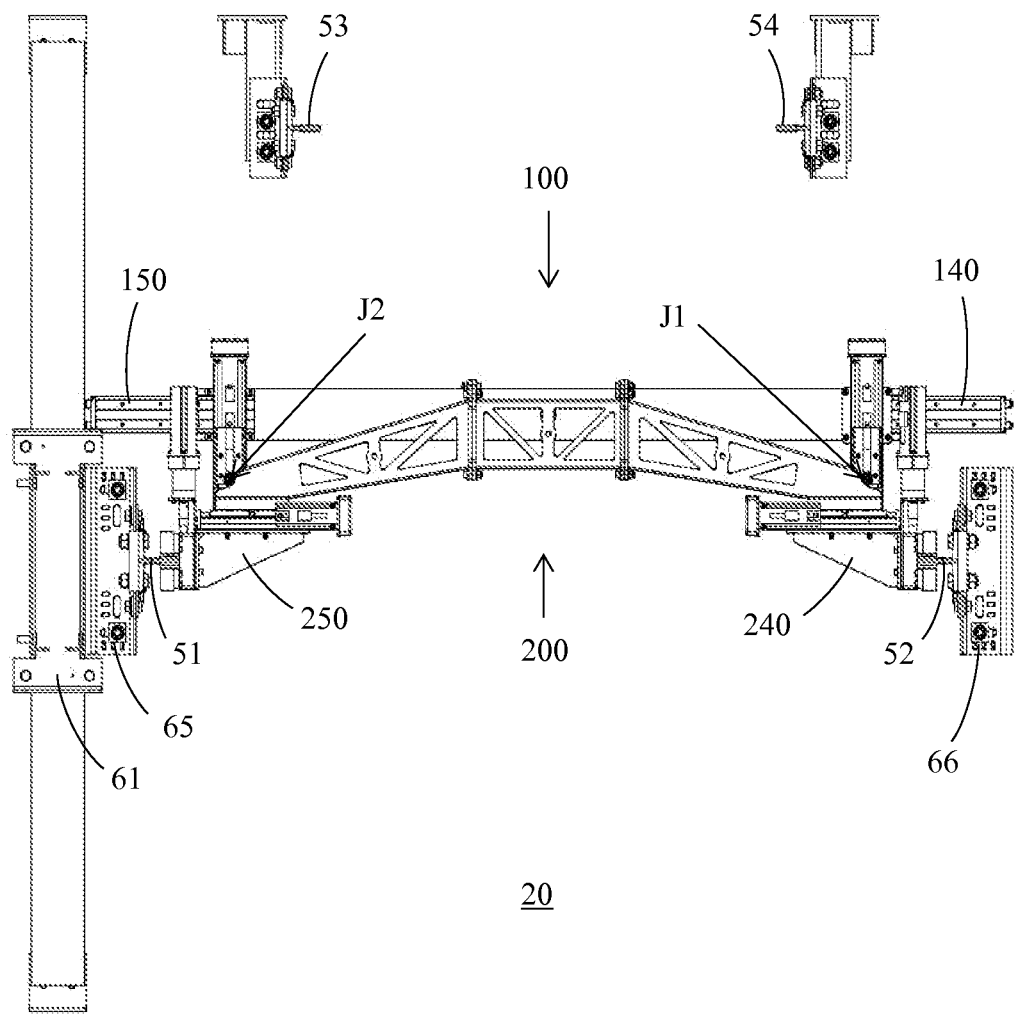
FIG. 5 shows a second phase of the operation of the apparatus of FIG. 3.

FIG. 5 shows a second phase of the operation of the apparatus of FIG. 3. The positioning unit 100 is locked to the wall constructions 21 or other support structures in the elevator shaft 20 with the attachment means 260, 270. The alignment unit 200 is in a floating mode in relation to the positioning unit 100 when the positioning unit 100 is locked to the wall construction 21 of the elevator shaft 20. The guide rails 51, 52 can now be adjusted with the alignment unit 200 and the positioning unit 100 in relation to the shaft 20. The bracket 60 bolts and the fish plate 65, 66 bolts are then tightened. The apparatus 500 can now be transported to the next bracket 60 location where the first phase and the second phase of the operation of the apparatus is repeated.

The use of the invention is naturally not limited to the type of elevator disclosed in the figures, but the invention can be used in any type of elevator e.g. also in elevators lacking a machine room and/or a counterweight.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for aligning guide rails in an elevator shaft, a lifting machinery moving an elevator car in a first direction upwards and downwards in the vertically extending elevator shaft being restricted by wall structures, the elevator car being guided by guide rails supported on the wall structures in the elevator shaft, wherein the apparatus comprises:
a positioning unit extending horizontally across the elevator shaft in a second direction and comprising a first attachment mechanism movable in the second direction at each end of the positioning unit for supporting the positioning unit on the opposite wall structures or other support structures in the elevator shaft; and
an alignment unit extending across the elevator shaft in the second direction and being supported with support parts on each end portion of the positioning unit so that each end portion of the alignment unit is individually movable in relation to the positioning unit in a third direction perpendicular to the second direction, and comprising a second attachment mechanism movable in the second direction at each end of the alignment unit for supporting the alignment unit on opposite guide rails in the shaft, said second attachment mechanism comprising a gripper for gripping on the guide rail,
whereby opposite guide rails can be adjusted in relation to each other and in relation to the elevator shaft with the apparatus.

2. The apparatus according to claim 1, wherein the positioning unit and the alignment unit comprises a centre portion and two opposite end portions, whereby the centre portion is changeable in order to change the length of the positioning unit and the alignment unit and thereby adapt the apparatus to elevator shafts of different dimensions.

3. The apparatus according to claim 2, wherein the two opposite end portions are mirror images of each other.

4. The apparatus according to claim 1, wherein the alignment unit is attached with articulated joints to the support parts.

5. The apparatus according to claim 1, wherein the gripper is formed by jaws being movable in the third direction, whereby the jaws grip on the side surfaces of the respective guide rail.

6. The apparatus according to claim 1, that each of wherein the first attachment mechanism is connected to an actuator in order to move the first attachment mechanism individually in the second direction.

7. The apparatus according to claim 1, wherein the second attachment mechanism is connected to an actuator in order to move the second attachment mechanism individually in the second direction.

8. The apparatus according to claim 1, wherein each of the support parts is connected to an actuator in order to move the support parts individually in the third direction.

9. The apparatus according to claim 5, wherein each of the jaws at both ends of the second attachment mechanism is connected to an actuator in order to move the jaws individually in the third direction.

10. A method for aligning guide rails in an elevator shaft, comprising the steps of:
using an apparatus comprising:
a positioning unit extending horizontally across the elevator shaft in a second direction and comprising a first attachment mechanism movable in the second direction at each end of the positioning unit for supporting the positioning unit on opposite wall structures or other support structures in an elevator shaft; and
an alignment unit extending across the elevator shaft in the second direction and being supported with support parts on each end portion of the positioning unit so that each end portion of the alignment unit is individually movable in relation to the positioning unit in a third direction perpendicular to the second direction, and comprising a second attachment mechanism movable in the second direction at each end of the alignment unit for supporting the alignment unit on opposite guide rails in the shaft, said second attachment mechanism comprising a gripper for gripping on the guide rail, for aligning opposite guide rails in an elevator shaft;
whereby the alignment unit is used to align the two opposite guide rails in relation to each other and the positioning unit is used to align the two opposite guide rails in relation to the elevator shaft.

11. The apparatus according to claim 2, wherein the alignment unit is attached with articulated joints to the support parts.

12. The apparatus according to claim 3, wherein the alignment unit is attached with articulated joints to the support parts.

13. The apparatus according to claim 2, wherein the gripper is formed by jaws being movable in the third direction, whereby the jaws grip on the side surfaces of the respective guide rail.

14. The apparatus according to claim 3, wherein the gripper is formed by jaws being movable in the third direction, whereby the jaws grip on the side surfaces of the respective guide rail.

15. The apparatus according to claim 4, wherein the gripper is formed by jaws being movable in the third direction, whereby the jaws grip on the side surfaces of the respective guide rail.

16. The apparatus according to claim 2, wherein the first attachment mechanism is connected to an actuator in order to move the first attachment mechanism individually in the second direction.

17. The apparatus according to claim 3, wherein the first attachment mechanism is connected to an actuator in order to move the first attachment mechanism individually in the second direction.

18. The apparatus according to claim 4, wherein the first attachment mechanism is connected to an actuator in order to move the first attachment mechanism individually in the second direction.

19. The apparatus according to claim 5, wherein the first attachment mechanism is connected to an actuator in order to move the first attachment mechanism individually in the second direction.

20. The apparatus according to claim 2, wherein the second attachment mechanism is connected to an actuator in order to move the second attachment mechanism individually in the second direction.

* * * * *